United States Patent
Miller et al.

(10) Patent No.: US 8,505,037 B2
(45) Date of Patent: Aug. 6, 2013

(54) COMMUNICATING WITH DEVICES IN AN ATM

(75) Inventors: Alexander P. Miller, Dundee (GB); Ian A. Cathro, Dundee (GB)

(73) Assignee: NCR Corporation, Duluth, GA (US)

( * ) Notice: Subject to any disclaimer, the term of this patent is extended or adjusted under 35 U.S.C. 154(b) by 1473 days.

(21) Appl. No.: 11/981,307

(22) Filed: Oct. 31, 2007

(65) Prior Publication Data

US 2009/0113459 A1    Apr. 30, 2009

(51) Int. Cl.
*G06F 3/00*    (2006.01)
*G06F 15/16*    (2006.01)

(52) U.S. Cl.
USPC .......................... 719/328; 719/330; 709/227

(58) Field of Classification Search
USPC .......................... 719/310, 328, 330; 709/227
See application file for complete search history.

(56) References Cited

U.S. PATENT DOCUMENTS

| | | | | |
|---|---|---|---|---|
| 5,655,148 A | * | 8/1997 | Richman et al. | 710/8 |
| 6,128,644 A | * | 10/2000 | Nozaki | 709/203 |
| 6,330,319 B1 | * | 12/2001 | Moghnie | 379/201.03 |
| 6,732,176 B1 | * | 5/2004 | Stewart et al. | 709/227 |
| 6,854,645 B1 | * | 2/2005 | Somers et al. | 235/379 |
| 7,472,191 B2 | * | 12/2008 | Stewart et al. | 709/227 |
| 7,730,131 B2 | * | 6/2010 | Blagsvedt et al. | 709/204 |
| 2001/0049737 A1 | * | 12/2001 | Carolan et al. | 709/228 |
| 2010/0208634 A1 | * | 8/2010 | Eng et al. | 370/310 |

OTHER PUBLICATIONS

Reinhold Eberhardt, Communication Application Programming Interfaces with Quality of Service Support, 1998.*

* cited by examiner

*Primary Examiner* — Lechi Truong
(74) *Attorney, Agent, or Firm* — Peter H. Priest

(57) ABSTRACT

A method of operating a self-service terminal is described, along with software for performing the method. The self-service terminal has a number of service providers installed on it. According to the method, a call from a self-service terminal application to open a session with a service provider is received by a manager module. The call includes details of a device related parameter, such as a logical service name or device class. Those service providers which can support the device related parameter are identified and then queried to determine if an associated device is present. Based on the results of the query, one of the service providers is selected and a session is opened between the self-service terminal application and the selected service provider module.

18 Claims, 4 Drawing Sheets

COMMUNICATING WITH DEVICES IN AN ATM

TECHNICAL FIELD

The present invention relates to communicating with devices installed in a self-service terminal. It is particularly related to, but in no way limited to, communication with devices within an Automated Teller Machine (ATM) which runs XFS (eXtensions for Financial Services).

BACKGROUND

FIG. 1 shows a schematic diagram of how a typical ATM application communicates with the devices installed in the ATM using the CEN (the European Committee for Standardization) XFS API (application programming interface). The ATM may have a number of devices 101-103 installed, such as a dispenser, a keypad and a receipt printer, with each device having an associated service provider 104-106. An ATM application 107 can communicate with one of these devices via an XFS Manager 108. The ATM application 107 makes a call to the XFS Manager 108 to open a session with one of the service providers 104-106 using a well-known name for the associated device, referred to as the 'logical service name'. The XFS Manager accesses a registry to identify the service provider corresponding to the particular logical service name included within the call and then opens a session with the relevant service provider. The XFS Manager 108 then acts as an intermediary between the ATM application 107 and the relevant service provider.

In an example, as shown in FIG. 1, the services for the cash dispenser module 101 are provided by service provider 1 104. A session with this service provider 104 may be opened using a call which includes the logical service name 'CurrencyDispenser'.

Traditionally, the logical service names are hard-coded within the ATM application, such that there is a fixed one to one relationship between a logical service name and a service provider. For example, an ATM application would always open a cash dispensing module session using the 'CurrencyDispenser' logical service name. Problems arise, however, where different vendors use different names for equivalent devices (e.g. 'Receipt_Printer' and 'ReceiptPrinter'), because then the application has to be tailored depending on the vendor. Additionally problems occur where a single vendor supports more than one variant of a given device (e.g. more than one keyboard) because then there may be more than one logical service name for equivalent devices which must be supported.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A method of operating a self-service terminal is described, along with software for performing the method. The self-service terminal has a number of service providers installed on it. According to the method, a call from a self-service terminal application to open a session with a service provider is received by a manager module. The call includes details of a device related parameter, such as a logical service name or device class. Those service providers which can support the device related parameter are identified and then queried to determine if an associated device is present. Based on the results of the query, one of the service providers is selected and a session is opened between the self-service terminal application and the selected service provider module.

A first aspect provides a method of operating a self-service terminal, the self-service terminal comprising a plurality of service providers and the method comprising: receiving a call from a self-service terminal application to open a session with a service provider, wherein the call identifies a device related parameter; identifying a subset of service providers from the plurality of service providers based on ability to support said device related parameter; querying each of the subset of service providers to obtain information on presence of a device associated with the service provider in the self-service terminal; selecting one of the subset of service providers based on said information; and opening a session between the self-service terminal application and the selected one of the subset of service providers.

The device related parameter may comprise one of a logical service name and a device class.

The self-service terminal may comprise an ATM, which may, in some examples, run XFS.

The method may further comprise: on installation of a service provider, storing data comprising a unique name for the service provider and at least one device related parameter supported by the service provider.

The step of identifying a subset of service providers from the plurality of service providers based on ability to support said device related parameter may comprise: accessing data provided by each of the plurality of service providers on installation; and identifying the subset of service providers from the plurality of service providers based on said data, wherein said data comprises a unique name for each service provider and at least one device related parameter supported by each service provider.

Additionally, querying each of the subset of service providers to obtain information on presence of a device associated with the service provider in the self-service terminal may comprise: opening a session with each service provider in the subset of service providers using the unique name for each service provider; and querying each service provider in the subset to obtain said information on presence of a device associated with the service provider in the self-service terminal.

Selecting one of the subset of service providers based on said information may comprise: if said information indicates presence of one device, selecting a service provider associated with said one device; and if said information indicates presence of no devices, selecting any one of the subset of service providers.

Selecting one of the subset of service providers based on said information may further comprise: if said information indicates presence of a plurality of devices, selecting a service provider associated with one of said plurality of devices.

In an embodiment, selecting one of the subset of service providers based on said information may further comprise: publishing data identifying the selected one of the subset of service providers. It may yet further comprise: closing each opened session with a service provider in the subset of service providers.

In this embodiment, the method may further comprise: on receipt of the call, running an executable arranged to perform the identifying, querying and selecting steps.

In another embodiment, opening a session between the self-service terminal application and the selected one of the subset of service providers may comprise: closing each opened session with a service provider in the subset of service providers except for the session with the selected one of the subset of service providers; and passing messages between the self-service terminal application and the selected one of the subset of service providers.

In this embodiment, receiving a call from a self-service terminal application to open a session with a service provider may comprise: receiving the call at a DLL (Dynamic Link Library) associated with the device related parameter.

A second aspect provides one or more device-readable media with device-executable instructions for performing steps comprising: receiving a call from a self-service terminal application to open a session with a service provider, wherein the call identifies a device related parameter and wherein the self-service terminal comprises a plurality of service providers; identifying a subset of service providers from the plurality of service providers based on ability to support said device related parameter; querying each of the subset of service providers to obtain information on presence of a device associated with the service provider in the self-service terminal; selecting one of the subset of service providers based on said information; and opening a session between the self-service terminal application and the selected one of the subset of service providers.

A third aspect provides an ATM comprising: a processor; a plurality of service providers; and a memory arranged to store executable instructions arranged to cause the processor to: receive a call from an ATM terminal application to open a session with a service provider, wherein the call identifies a device related parameter and wherein the ATM comprises a plurality of service providers; identify a subset of service providers from the plurality of service providers based on ability to support said device related parameter; query each of the subset of service providers to obtain information on presence of a device associated with the service provider in the ATM; select one of the subset of service providers based on said information; and open a session between the ATM application and the selected one of the subset of service providers.

Many of the attendant features will be more readily appreciated as the same becomes better understood by reference to the following detailed description considered in connection with the accompanying drawings. The preferred features may be combined as appropriate, as would be apparent to a skilled person, and may be combined with any of the aspects of the invention.

BRIEF DESCRIPTION OF THE DRAWINGS

Embodiments of the invention will be described, by way of example, with reference to the following drawings, in which.

Figure 1:
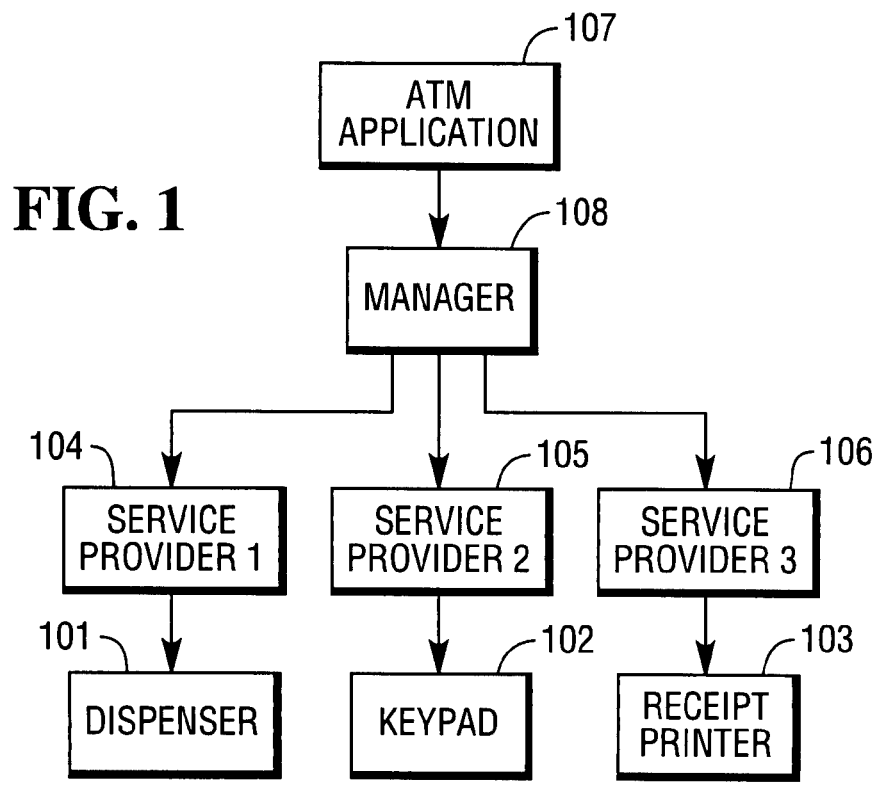
FIG. 1 is a schematic diagram showing how a typical ATM application communicates with the devices installed in the ATM.

Common reference numerals are used throughout the figures to indicate similar features.

DETAILED DESCRIPTION

Embodiments of the present invention are described below by way of example only. These examples represent the best ways of putting the invention into practice that are currently known to the Applicant although they are not the only ways in which this could be achieved.

One solution to the need to support multiple equivalent devices or multiple logical names for the same device, is to modify the ATM application to search a registry for service providers matching the given class of device (e.g. the class of keyboards in the example given earlier). However, this requires the application to be modified.

Another possible solution is for the system to identify which devices are available on start up (i.e. at the end of the platform load) and populate a registry with the devices found. However, this may lead to synchronization problems, as applications may start automatically (before the platform has completed its load) and there may not be sufficient time to identify the devices and populate the registry before the application has opened the session. Where an application has already opened a session before the population of the registry is complete, the application will not see all the devices available on the ATM. In order to resolve this, the ATM would need to be rebooted after the registry has been fully populated.

A third possible solution is to only install the service providers for the devices which are actually present on the ATM. However, this requires the software to be tailored for each individual ATM and prevents the same software from being installed on a large range of machines. This creates a configuration management problem as the combinations of hardware rise exponentially. Additionally, the second and third possible solutions do not address the multi-vendor issues of logical service name differences.

Figure 2:
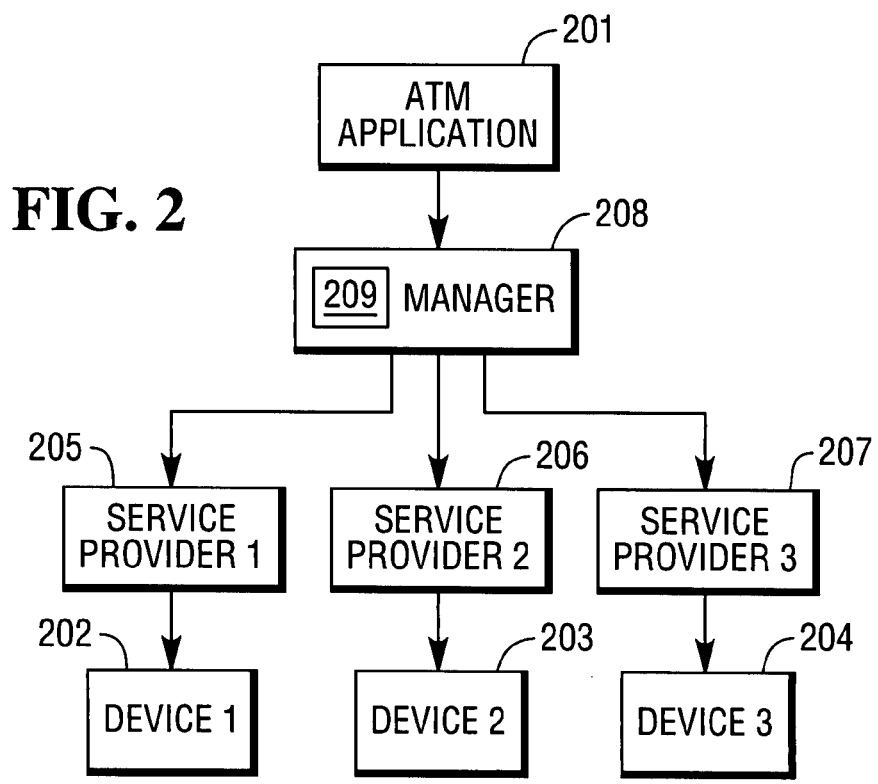
FIG. 2 is a schematic diagram showing how an ATM application communicates with the devices installed in the ATM.

A solution which enables the system to be software plug and play is shown in FIG. 2, which shows a further schematic diagram of an ATM application 201 communicating with devices 202-204 on the ATM. Each device is controlled by a service provider 205-207. The system includes a Manager 208, which may be referred to as the 'XFS Manager' where the ATM runs XFS. The methods described herein are not limited to implementation in an ATM which runs XFS and alternative standards and protocols may be used. Furthermore, the use of the term 'registry' does not limit the methods to implementations running on Microsoft Windows™ and any suitable data store may be used.

The Manager 208 includes additional functionality 209 compared to the XFS Manager shown in FIG. 1, which enables the Manager to select a particular service provider (and the associated device) on receipt of a call to open a session with a service provider from the ATM application 201. The additional functionality 209 may be referred to as a 'Resolver'. The operation of the ATM application 201 and the devices 202-204 need not be affected by the additional functionality of the Manager, although the devices may receive additional queries which they are already designed to respond to (e.g. additional status queries). The service providers 205-207 are modified to provide information on installation, as described below. The Manager 208 may comprise a DLL (Dynamic Link Library) which is loaded at run time or the Manager may comprise a collection of DLLs. The additional functionality 209 of the Manager 208 may be provided in a number of different ways and two examples are described below. In the first example (described with reference to FIG. 3) the functionality is provided by an executable which is run by the Manager and in the second example (described with reference to FIG. 4) the functionality is provided by one or more DLLs. Additional methods, which may be described in terms of variations of the methods shown in FIGS. 3 and 4, are also described below.

Figure 3:
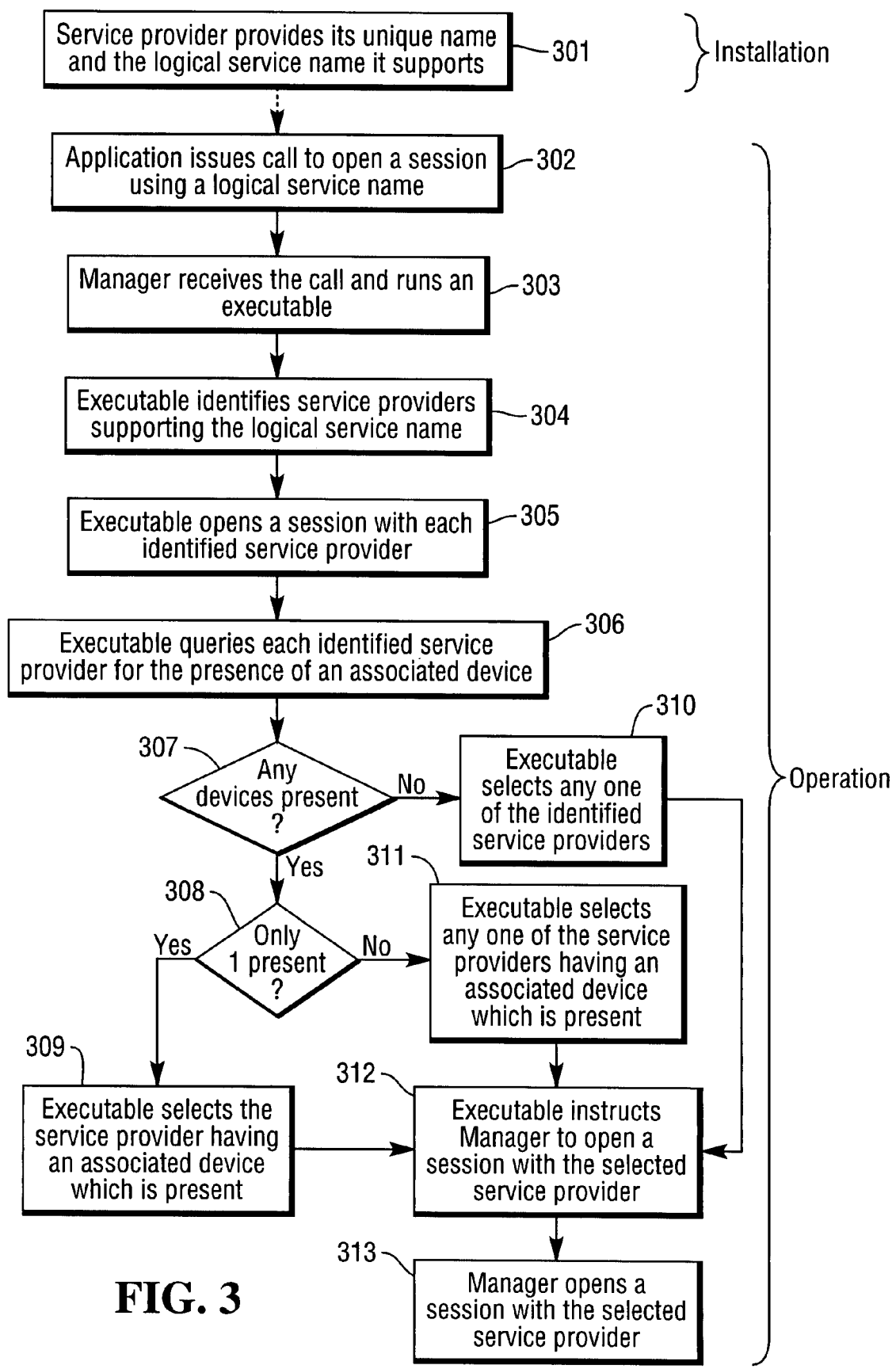
FIGS. 3 and 4 show example flow diagrams of methods of operation of an ATM.
Figure 4:
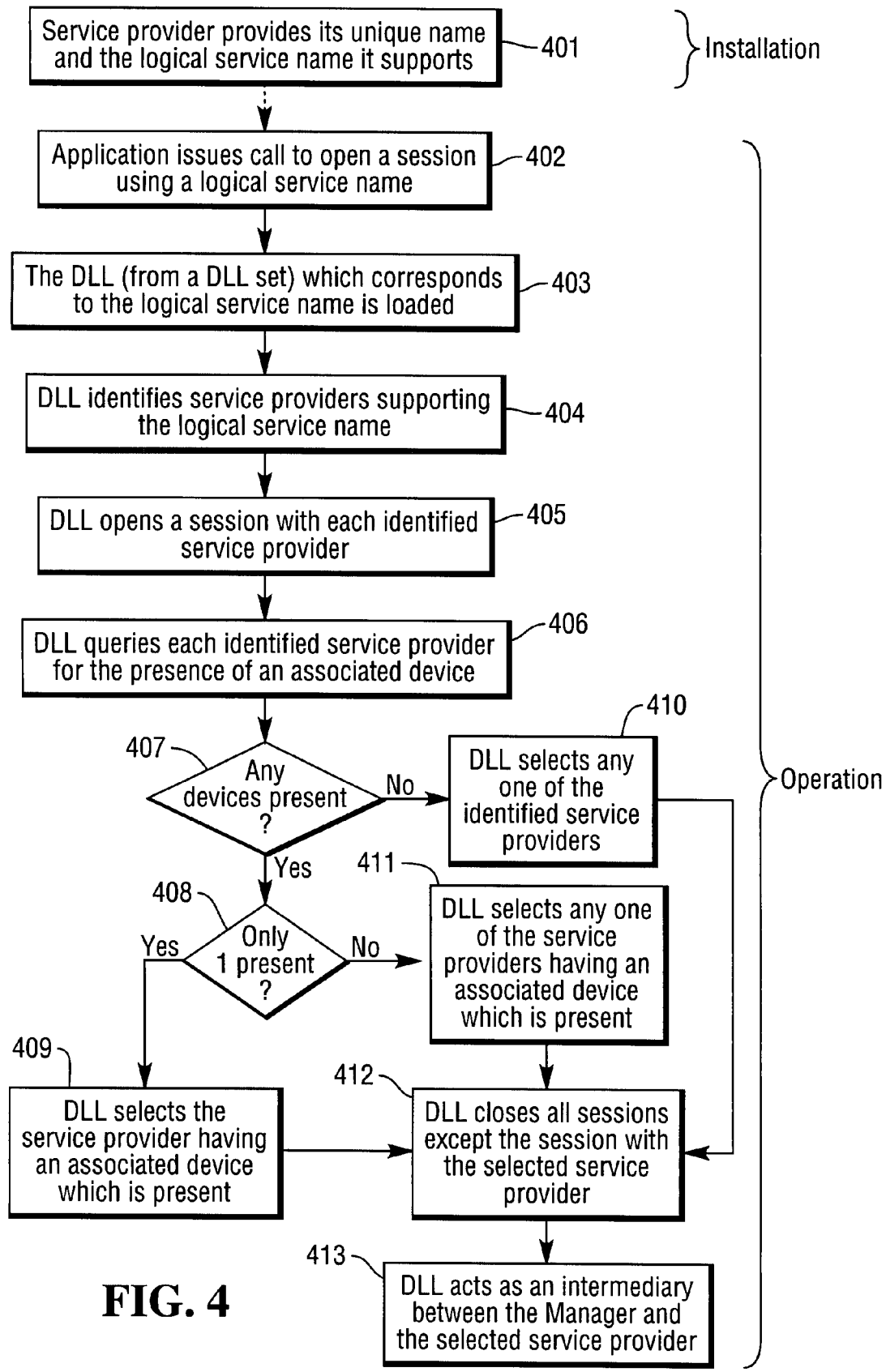

FIG. 3 shows an example flow diagram of a method of operation of an ATM. On installation, each service provider 205-207 provides details of its unique name (e.g. Receipt-Printer1) and the corresponding logical service name (e.g. ReceiptPrinter) that it supports (block 301). In some examples it may also provide details of device class it supports (e.g. the receipt printing class), where the device classes may be those which are defined by CEN, and/or additional parameters. The details provided (in block 301) may be used to populate the registry and this may be done either by the service providers themselves or by the Manager.

In operation, when the ATM application 201 issues a call to open a session using a logical service name (block 302), the call is received by the Manager 208 which causes it to run an executable (block 303). The executable uses the data provided on installation (in block 301), which may be in a registry, to identify those service providers which support the required logical service name (block 304). A session is then opened which each of these identified service providers (block 305) and the corresponding devices are queried for presence/status (block 306). Generally, these queries will identify the presence of one device which can support the particular logical service name or alternatively will identify that there are no such devices (physically) present in the ATM. A third possible situation is that there is more than one such device present.

If one device is present, ('Yes' in both blocks 307 and 308), the executable selects the service provider which is associated with that present device (block 309), e.g. if both service provider 1 205 and service provider 2 206 have indicated that they can support the required logical service name, but device 1 202 is present and device 2 203 is not, then the executable will select service provider 1 205. If there are no devices which are present ('No' in block 307) the executable selects any of the identified service providers (block 310) e.g. if both service provider 1 205 and service provider 2 206 have indicated that they can support the required logical service name but neither device 1 nor device 2 are present, either service provider 1 or service provider 2 is selected. If more than one device is present ('Yes' in block 307 and 'No' in block 308), the executable selects any one of the identified service providers having a device which is present (block 311) e.g. if both service provider 1 205 and service provider 2 206 have indicated that they can support the required logical service name and both device 1 and device 2 are present, either service provider 1 or service provider 2 is selected. The service provider may be selected according to any defined criteria such as:

the service provider which responds first to indicate that their associated device is present;
the service provider that provided details first on installation (in block 301); or
the service provider with the unique name which is the same as (or closest to) the logical service name.

Once the executable has selected a service provider (in one of blocks 309-311), the executable closes all the sessions opened (in block 305) and instructs the Manager to open a session with the selected service provider (block 312), e.g. by publishing the details of the selected service provider. The Manager then opens up the session with the selected service provider (block 313) and the interaction between the ATM application and the service provider continues with the Manager as an intermediary but without the further involvement of the executable. Where there are no devices present which can support the required logical service name ('No' in block 307), in the subsequent interaction between the ATM application and the service provider (via the Manager), the service provider will respond with a status message indicating that there is no device present and at this point the ATM application may choose to close the session.

In an example, there may be three different variants of receipt printer used by a particular vendor (or by multiple vendors in a multi-vendor system) and each of the three variants (i.e. the three service providers, one for each printer variant) will be installed on the ATM. Each of the receipt printers has a different unique name, for example:

ReceiptPrinterDotMatrix
ReceiptPrinterInkJet
ReceiptPrinterColor

The ATM application may only be aware of a single logical service name for a receipt printer, such as ReceiptPrinter. On installation, each service provider indicates that they support the ReceiptPrinter logical service name and also provides the unique name for their associated receipt printer (e.g. one of the three unique names listed above). This information may be inserted into a registry by each service provider or stored elsewhere. When the ATM application opens a session with ReceiptPrinter, the Manager runs the executable which identifies that the three service providers support the ReceiptPrinter logical service name and opens a session with each of the three service providers, using the three unique names listed above. The executable then issues a device status command (for example WFS_INF_PTR_STATUS) to each service provider to find out which receipt printer device is present. The service provider whose device is present is then identified to the Manager by the executable and the Manager then opens a session with that service provider. These method steps (e.g. blocks 303-313) are transparent to the ATM application and are performed during the waiting time of the ATM application (i.e. whilst the ATM application waits for the service provider to respond to the open session request).

In an example, the executable, which may be referred to as the 'Resolver', may identify the service providers supporting the logical service name (in block 304) by checking the registry and may inform the Manager which service provider to load (in block 312) by modifying the registry (such as the Windows Registry).

In a further example, the above system may be implemented using a collection of DLLs, (which may in an example be referred to as the 'Resolver') and FIG. 4 shows an example flow diagram of a method of operation of an ATM in such an embodiment. On installation, each service provider registers its unique name and details of the logical service name it supports (block 401), as described above (with reference to block 301). Each of the DLLs within the collection of DLLs may be fixed as the service provider for a particular logical service name (e.g. in a fixed one to one relationship) and therefore when the ATM application issues a call to open a session (in block 402) this is directed to the corresponding one of the collection of DLLs (block 403). The DLL uses the data provided on installation (in block 401), which may be in a registry, to identify those service providers which support the required logical service name (block 404). A session is then opened which each of these identified service providers (block 405) and the corresponding devices are queried for presence/status (block 406).

As in FIG. 3, there are three possible outcomes: no device present, one device present or more than one device present. If one device is present ('Yes' in both blocks 407 and 408), the DLL selects the service provider which is associated with that device which is physically present (block 409). If no devices are present ('No' in block 407) the DLL selects any of the identified service providers (block 410). If more than one device is present ('Yes' in block 407 and 'No' in block 408), the DLL selects any one of the identified service providers having a device which is present (block 411). The service provider may be selected (in block 411) according to any defined criteria, including, but not limited to, one of those detailed above in relation to FIG. 3. Once the DLL has selected a service provider (in one of blocks 409-411), the DLL closes all the sessions with service providers except for the session with the selected service provider (block 412). The DLL then passes through application commands to and from the selected service provider acting as an intermediary between the selected service provider and the Manager (block 413). Where no device is present ('No' in block 407), in the subsequent interaction between the ATM application and the service provider (via the Manager and the DLL), the service provider will respond with a status message indicating that there is no device present and at this point the ATM application may choose to close the session.

In this example, the operation of the collection of DLLs (the Resolver) is transparent to the application (blocks 403-411), in a corresponding manner to the operation of the executable in FIG. 3, however, in this method, one of the collection of DLLs remains as an intermediary between the service provider and the ATM application, whereas in FIG. 3 the executable provides instructions to the Manager and then plays no further part in the session.

The DLL may open a session with each identified service provider (in block 405) by loading the DLLs for each of the service providers that have registered their capability for that logical service name and querying the status of each appropriate device (e.g. by issuing the device status command to each service provider, as described above).

Whilst in the above two examples, the identification and selection of a service provider is performed on the basis of the logical service name which is included in the call to open a session, in other examples, alternative parameters may be used. In further examples, the device class may be used and the method of operation of an ATM may be a modified version of that shown in FIG. 3 or 4. The device classes used may be as defined in the CEN XFS standard. In such an example, on installation the service provider provides both its unique name and the device class it supports (in a corresponding manner to blocks 301 and 401). This data may be used to populate a registry or stored elsewhere. A device class may be included in the session call by the ATM application, either in addition to or instead of a logical service name (in a step corresponding to step 302 or 402). The device class may then be used by the executable to identify service providers (in a corresponding manner to block 304). In the DLL variant, the device class is used to determine which DLL from the set of DLLs is loaded (in a block which corresponds to block 403) and to identify service providers (in a corresponding manner to block 404). Having identified service providers, the methods may continue as shown in FIG. 3 (blocks 305-313) or FIG. 4 (blocks 405-413).

In further examples, (which may be considered variants of the methods shown in FIGS. 3 and 4), whilst the call to open a session may include the logical service name and in some embodiments not include the device class, the device class may still be used to identify service providers (in blocks corresponding to blocks 304 and 404). In such examples each service provider provides its unique name and the device class which it supports on installation (in a corresponding manner to blocks 301 and 401) and the methods may include an additional step, as described below. Where an executable is used, in a step between blocks which correspond to blocks 303 and 304, the executable translates from the logical service name to the device class. This may use a look-up table or any other suitable method. Beyond the identification of the service providers, the method may continue as shown in FIG. 3 (blocks 305-313). Where a DLL is used, the translation may occur between blocks corresponding to blocks 402 and 403, such that the DLL which corresponds to the device class is loaded (in a block corresponding to block 403). Alternatively the translation may occur between blocks corresponding to blocks 403 and 404. Again the translation may be performed using any suitable technique, including but not limited to using a look-up table. Following the identification of the service providers (in a block corresponding to block 404), the method may continue as shown in FIG. 4 (blocks 405-413).

In yet further examples, the service providers may, on installation, provide details of their unique name and both the logical service name and device class which they support. In such an example, one or both of the logical service name and the device class may be used to identify the service providers in response to a call to open a session.

It will be appreciated that whilst, in the examples above, the call to open a session which is issued by the ATM application is described as including a logical service name and/or a device class, the calls may include many other parameters. In the above description, only those elements which are necessary to describe the methods are mentioned and many additional elements/parameters may be present. Similarly it will be appreciated that FIG. 2 shows only a subset of the elements within an ATM.

The methods described above enable the same ATM application and Manager to be installed on all ATMs irrespective of the actual devices installed on any one machine. The ATM application does not need to know what devices are physically installed on the particular ATM and/or what unique names these devices respond to. The changes made to the system (i.e. the changes made to the Manager by the introduction of the Resolver which comprises an executable or a collection of DLLs) are transparent to the ATM application which makes the ATM application less vendor and device specific and the fact that the application does not require any changes may be a significant benefit where the application is provided by a third party. Furthermore, the methods enable extra service providers to be added (e.g. during the life of the ATM) without requiring any changes to the application. The service provider can be installed at any time, and on installation it provides its unique name and details of the logical service name and/or device class that it supports. By populating the registry on installation of each service provider and then resolving those devices which are available when a session is opened, the latency problems described above are avoided and the system is much more flexible (e.g. upgrades are enabled). Additional reboots are not required and the configuration management problems do not arise.

Where a single device supports multiple logical service names (or multiple device classes), such as a recycling device which may be capable of both dispensing cash and receiving cash (e.g. as a deposit), the device may be considered logically as two modules, i.e. as two logically separate devices controlled by two logically or physically different service providers.

The methods described above provide a vendor-independent solution. The ATM application may be produced by any vendor as it uses standardized session calls. In addition (or instead) the devices may be provided by any vendor because the ATM application is not required to know the unique names of all the devices and the Manager uses logical service names (which may be standardized or defined for a particular vendor's ATM application) or standardized device classes in order to associate the calls made by the ATM application and the particular service providers that can offer the required device.

Whilst in FIG. 2 each service provider is shown communicating with a single device, this is by way of example only. In some situations a service provider may control more than one device (e.g. a service provider may control two different receipt printers), however this is not practical in many circumstances, particularly where two devices have different interfaces (e.g. WIN32 and proprietary interfaces).

The examples given above refer to multiple different receipt printers by way of example only. Receipt printers are just one example of a device which may be included within an ATM and where multiple variants may be available. Other examples include, but are not limited to, dispensers, keyboards, displays, card readers or any other device within an ATM. As described above, the methods are also not limited to any particular ATM implementation, i.e. the methods are not limited to Microsoft Windows (trade mark) and/or XFS based ATMs. Furthermore, whilst the above description refers to ATMs, this is by way of example only and the methods are applicable to any type of self-service terminal (SST), including, for example, ticket machines, teller assist machines, self-checkout machines and vending machines.

Figure 5:
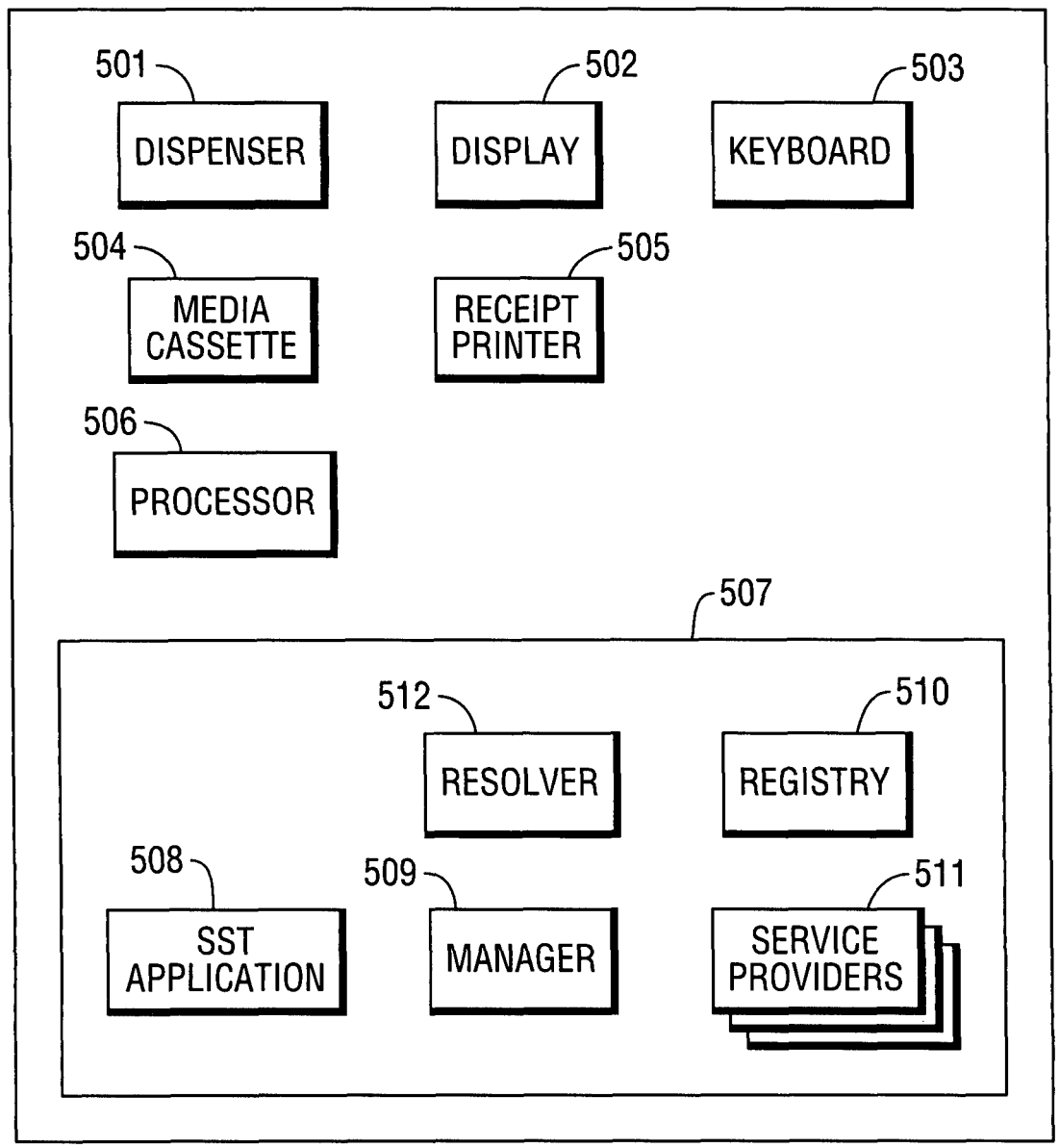
FIG. 5 is a schematic diagram of a self-service terminal.

FIG. 5 is a schematic diagram of a self-service terminal 500, such as an ATM, in which embodiments of the methods described above may be implemented. The self-service terminal 500 comprises a plurality of installed devices 501-505, such as a dispenser 501, a display 502, a keyboard 503 (or other user interface device), a media cassette 504 and a receipt printer 505. The plurality of installed devices may comprise more than one device of the same device class, such as two receipt printers. The terminal also comprises one or more processors 506 which may be microprocessors, controllers or any other suitable type of processors for processing computing executable instructions to control the operation of the terminal. The computer executable instructions, which include a SST application 508, a Manager 509 (which may comprise one or more DLLs), a registry 510 and one or more service provider modules 511, may be provided using any computer-readable media, such as memory 507. The Resolver 512 may also be provided in the memory 507 and may be separate to or integrated with the Manager 509. The Resolver 512 may comprise an executable or a collection of DLLs. The memory may be of any suitable type such as random access memory (RAM), a disk storage device of any type such as a magnetic or optical storage device, a hard disk drive, or a CD, DVD or other disc drive. Flash memory, EPROM or EEPROM may also be used. Platform software comprising an operating system or any other suitable platform software may also be provided (not shown in FIG. 5) to enable application software 508, Manager 509 and Resolver 512 to be executed on the SST.

Any range or device value given herein may be extended or altered without losing the effect sought, as will be apparent to the skilled person. It will be understood that the benefits and advantages described above may relate to one embodiment or may relate to several embodiments. It will further be understood that reference to 'an' item refers to one or more of those items.

It will be understood that the above description of a preferred embodiment is given by way of example only and that various modifications may be made by those skilled in the art.

The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

The methods described herein may be performed by software in machine readable form on a storage medium. The software can be suitable for execution on a parallel processor or a serial processor such that the method steps may be carried out in any suitable order, or simultaneously. This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

What is claimed is:

1. A method of operating automated teller machine, the a plurality of service providers installed on the automated teller machine and controlling a plurality of devices of the automated teller machine, the method comprising:

receiving a call from an automated teller machine application to open a session with a service provider, wherein the call identifies a device related parameter where the subset may include more than one service provider;

identifying a subset of service providers from the plurality of service providers based on ability to support said device related parameter;

querying each of the subset of service providers to obtain information on presence of a device associated with the service provider in the automated teller machine;

selecting one of the subset of service providers based on said information; and opening a session between the automated teller machine application and the selected one of the subset of service providers;

wherein identifying a subset of service providers from the plurality of service providers based on ability to support said device related parameter comprises:

accessing data provided by each of the plurality of service providers on installation; and identifying the subset of service providers from the plurality of service providers based on said data, wherein said data comprises a unique name for each service provider and at least one device related parameter supported by each service provider.

2. A method according to claim 1, wherein the device related parameter comprises one of a logical service name and a device class.

3. A method according to claim 1, wherein the automated teller machine runs for Financial Services.

4. A method according to claim 1, wherein querying each of the subset of service providers to obtain information on presence of a device associated with the service provider in the automated teller machine comprises:
opening a session with each service provider in the subset of service providers using the unique name for each service provider; and
querying each service provider in the subset to obtain said information on presence of a device associated with the service provider in the automated teller machine.

5. A method according to claim 4, wherein selecting one of the subset of service providers based on said information comprises:
if said information indicates presence of one device, selecting a service provider associated with said one device; and
if said information indicates presence of no devices, selecting any one of the subset of service providers.

6. A method according to claim 5, wherein selecting one of the subset of service providers based on said information further comprises:
if said information indicates presence of a plurality of devices, selecting a service provider associated with one of said plurality of devices.

7. A method according to claim 5, wherein selecting one of the subset of service providers based on said information further comprises:
publishing data identifying the selected one of the subset of service providers.

8. A method according to claim 5, wherein selecting one of the subset of service providers based on said information further comprises:
closing each opened session with a service provider in the subset of service providers.

9. A method according to claim 1 wherein the method further comprises:
on receipt of the call, running an executable arranged to perform the identifying, querying and selecting steps.

10. A method according to claim 1, wherein opening a session between the automated teller machine application and the selected one of the subset of service providers comprises:
closing each opened session with a service provider in the subset of service providers except for the session with the selected one of the subset of service providers; and
passing messages between the automated teller machine application and the selected one of the subset of service providers.

11. A method according to claim 1, wherein receiving a call from an automated teller machine application to open a session with a service provider comprises:
receiving the call at a DLL associated with the device related parameter.

12. A method according to claim 1, further comprising:
on installation of a service provider, storing data comprising a unique name for the service provider and at least one device related parameter supported by the service provider.

13. The method of claim 1 wherein the plurality of devices in the automated teller machine comprise a dispenser, a display, a keyboard, a media cassette and a receipt printer.

14. The method of claim 13 wherein more than one devices of a first device class are installed in the automated teller machine.

15. The method of claim 14 wherein no devices of a second device class are installed in the automated teller machine and at least one service provider for the second device class is installed on the automated teller machine.

16. The method of claim 15 wherein the step of querying is performed by an automated teller machine application executed by a control processor of the automated teller machine.

17. One or more device-readable storage media with device-executable instructions for performing steps comprising:
receiving a call from an automated teller machine application to open a session with a service provider installed on an automated teller machine, wherein the call identifies a device related parameter and wherein the automated teller machine comprises a plurality of service providers which control a plurality of devices of the automated teller machine;
identifying a subset of service providers from the plurality of service providers based on ability to support said device related parameter where the subset may include more than one service provider;
querying each of the subset of service providers to obtain information on presence of a device associated with the service provider in the automated teller machine;
selecting one of the subset of service providers based on said information; and
opening a session between the automated teller machine application and the selected one of the subset of service providers;
wherein identifying a subset of service providers from the plurality of service providers based on ability to support said device related parameter comprises:
accessing data provided by each of the plurality of service providers on installation; and
identifying the subset of service providers from the plurality of service providers based on said data,
wherein said data comprises a unique name for each service provider and at least one device related parameter supported by each service provider.

18. An automated teller machine comprising:
a processor;
a plurality of service providers; and
a memory arrange to store executable instructions arranged to cause the processor to:
receive a call from an automated teller machine application to open a session with a service provider, wherein the call identifies a device related parameter and wherein the automated teller machine comprises a plurality of service providers installed on the automated teller machine and controlling a plurality of devices of the automated teller machine;
identify a subset of service providers from the plurality of service providers based on ability to support said device related parameter where the subset may include more than one service provider;
query each of the subset of service providers to obtain information on presence of a device associated with the service provider in the automated teller machine;
select one of the subset of service providers based on said information; and open a session between the automated teller machine application and the selected one of the subset of service providers,
wherein identifying a subset of service providers from the plurality of service providers based on ability to support said device related parameter comprises:
accessing data provided by each of the plurality of service providers on installation; and
identifying the subset of service providers from the plurality of service providers based on said data,
wherein said data comprises a unique name for each service provider and at least one device related parameter supported by each service provider.

\* \* \* \* \*